United States Patent

[11] 3,620,759

[72] Inventor V Harold Maddox
Huntington Woods, Mich.
[21] Appl. No. 811,772
[22] Filed Apr. 1, 1969
[45] Patented Nov. 16, 1971
[73] Assignee Parke, Davis & Company
Detroit, Mich.

[54] FOOD CAPSULE
9 Claims, 3 Drawing Figs.

[52] U.S. Cl. .................................................. 99/78,
99/66, 99/71, 99/77.1, 99/124, 99/171 B, 206/0.5,
424/15
[51] Int. Cl. ....................................................... A23l 1/00
[50] Field of Search........................................... 99/66, 78,
171 B, 77.1, 1, 79, 199, 71, 124; 206/63.2 R, 15,
46 F, 84; 222/107; 424/21, 15, 37; 220/60 R;
18/25

[56] References Cited
UNITED STATES PATENTS
1,527,610 2/1925 Scott ............................ 424/21
1,931,765 10/1933 Leever ........................ 99/77.1
1,393,045 10/1921 Scott ............................ 99/71
2,105,690 1/1938 Greenblatt ................... 99/78
2,889,226 6/1959 Hinkley ........................ 99/78 X
3,293,766 12/1966 Togashi et al................. 99/199 X
3,399,803 9/1968 Oglevee et al. ............... 222/60

OTHER REFERENCES
Remington, Practice of Pharmacy, 1956, pp. 389–392

Primary Examiner—Morris O. Wolk
Assistant Examiner—Stephen B. Davis
Attorneys—Robert R. Adams, David B. Ehrlinger, George M. Richards and Edward J. Gall ABSTRACT: A packaged food article for constitution with water (or other aqueous potable liquid) is provided in the form of a perforated hard shell gelatin capsule containing a predetermined quantity of a soluble food extract. The capsule wall is perforated at a number of points spaced over the middle and both ends of the capsule so that, when a serving of hot water is agitated with the capsule, contact of the article with water is extensive whereby both the container and the contents promptly dissolve to provide refreshment for immediate consumption.

PATENTED NOV 16 1971 3,620,759

INVENTOR.
V HAROLD MADDOX
BY David B. Ehrlinger
ATTORNEY

FOOD CAPSULE

SUMMARY AND DETAILED DESCRIPTION

This invention relates to a novel packaged food article in the form of a perforated gelatin capsule containing a soluble food extract.

In the prior art various forms of products have been provided for the instant preparation of beverages and the like. One food item widely used is "instant" coffee available as a bulk powder contained in a sealed jar. Powdered food items of this type present a problem in measuring and handling in that they can be readily spilled. The spilled powder represents a loss and is a sanitary and cleaning problem. Another problem is that the powders tend to pick up water on repeated exposure of the opened jar. When the powders take up moisture they pack and form lumps. In this form the powders lose flowability and are difficult to dispense. The products furthermore deteriorate when exposed to moisture and lose valuable flavor and aroma.

It is therefore an object of the present invention to provide a novel packaged food article which can be combined with water or the like to provide an instant liquid food without attendant food loss, mess, spillage, etc.

It is also an object of the invention to provide an instant food product which is edible in packaged form and which in that form can be readily and conveniently dispensed.

Another object of the invention is to provide an instant food product in a form which facilitates the retention of desired aroma and flavor.

These and other objects, purposes and advantages of the invention will be seen from the following description in relation to the accompanying drawing in which.

Figure 1:
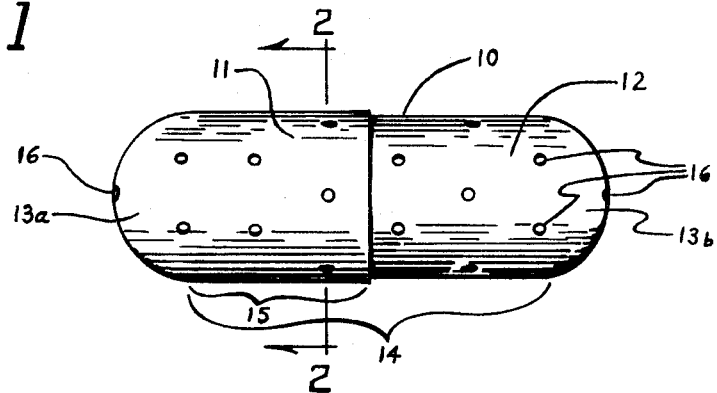
FIG. 1 is a side view of a packaged food article according to a preferred embodiment of the invention.
Figure 2:
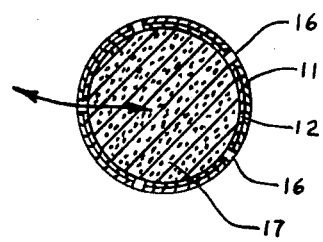
FIG. 2 is a view in section taken on line 2—2 of FIG. 1 showing the double-walled construction of a food article of the invention.
Figure 3:
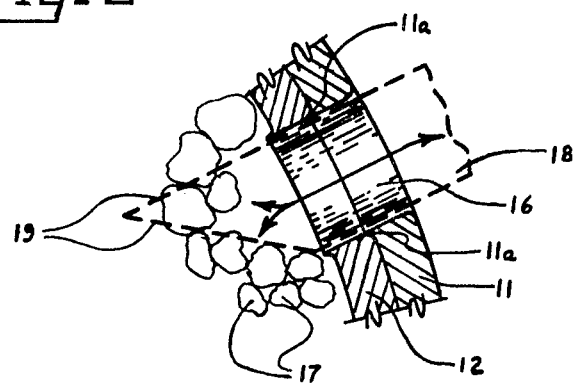
FIG. 3 is an enlarged fragmented view partly in section of a perforated capsule wall and its adjacent detail.

Referring to FIG. 1, the food article of the invention includes a capsule 10 having a cylindrical cap part 11 and a matching telescopically engaged body part 12. The cap part 11 and the body part 12 have end portions 13a and 13b as well as cylindrical walls indicated generally by the bracket 14. The walls overlap in a double-walled portion 15. Throughout the end portions 13a and 13b and cylindrical walls 14 at spaced intervals are perforations 16. The perforations provide open communication from the exterior of the capsule to the interior as seen in FIG. 2. According to the invention the interior of the capsule contains a fill of a suitable instant food 17 which is of the type that dissolves or disperses promptly on addition of water. In a preferred form of the invention the capsule 10 contains five perforations in each of the end portions 13a and 13b; it also contains 20 perforations in the cylindrical walls 14 at spaced intervals. According to the invention the capsule is maintained in dry form in a suitable enclosure such as an hermetically sealed bottle, blister pack package, strip package or the like until ready for use. It is then taken up and added to a suitable quantity of hot water with stirring to cause the article, including its contents, to be dissolved or dispersed in the water. It will be realized in this connection that some foods or food components of the type contemplated will dissolve while others will be dispersed, for example, as a colloid or colloidal suspension. As the water contacts the capsule 10 it enters the several perforations 16, passes through the capsule walls and comes into contact with the food content 17 as seen in FIG. 3. Since instant foods are more soluble or dispersable in water than is gelatin, the usual result in accordance with the invention is that the food contents begin to dissolve or disperse first rather than the gelatin. With continued stirring and agitation, at least part of the contents in dissolved form are leached from the capsule 10 by way of the perforations 16. The process is a dynamic one with further amounts of water entering and leaving the perforations and continuing to dissolve and disperse further portions of the contents. At the same time the water serves to gradually dissolve the gelatin; The dissolving of the gelatin in turn has the effect of increasing the size of the perforations and decreasing the wall thickness. The stirring is continued until the contents, as well as the gelatin envelope, are completely constituted in liquid form at which point the item is ready for serving and consumption. As indicted above, one can use either water alone or any of various aqueous potable liquids for constitution in the way contemplated by the invention. Accordingly, for convenience of description the term "water" as used hereinafter will be understood to mean water or any such other aqueous liquid. In the usual case, preparation as described requires only a brief period of approximately 30–60 seconds. The result is quite unexpected since food articles which contain an instant food but which have a conventional gelatin capsule envelope without perforations fail to dissolve even after periods of 2 minutes or more. In the ordinary case the latter products when dropped into hot water form an outer gelatinous surface which is sticky and gummy and which prevents the capsule from going into solution. Such products have been altogether unsatisfactory.

The mentioned perforations 16 in the double-walled portion 15, according to the invention, are preferably arranged so that at least some of them are directly in registry and so provide direct open communication between the interior and the exterior of the capsule (as indicated by the double arrow of FIGS. 2 and 3). By this means circulation of water into and out of the capsule is distributed at spaced points along what is the most difficult portion of the capsule to dissolve so that the dissolution of the capsule proceeds more uniformly.

A convenient way of forming the perforations in the capsule according to the invention is by first filling the body 12, then joining the latter with the cap 11 and finally puncturing the wall with a metal needle such as a "hypodermic" needle, preferably heated to elevated temperature sufficient to soften the gelatin on contact. For this purpose a No. 19 hypodermic (O.D., 1.07 mm.) needle provides good results. Good results are also obtained, for example, with a No. 20 (0.89 mm.) or No. 21 (0.81 mm.) needle. Capsules having an array of 30 perforations (FIG. 1), made with a No. 22 (0.71 mm.) needle, are also satisfactory, but the dissolution rate tends to be somewhat slow so that in such a case additional perforations can be provided, if desired, to increase the dissolution rate. It is preferred therefore to provide open communication at least equivalent to that provided by an evenly spaced array of 20 perforations through the cylindrical walls and five perforations in each of the two end portions, more preferably with 10 perforations in the double-walled portion 15, the perforations being preferably circular and at least about 0.7 mm. in diameter. On the other hand, needles larger than No. 19 may be less satisfactory, especially where the capsule content is in finely divided or powder form. In other words, the perforations should be sufficiently large and in sufficient number to permit immediate passage of water for prompt mixing and yet should be small enough to prevent powder leakage and to retain the food contents. The perforations can be made by any satisfactory way. For example, the needles can be hollow or solid or with pointed or rounded ends, etc. It is not essential for purposes of the invention to form the perforations by insertion of heated needles; other satisfactory means will be apparent to those skilled in the art. It is an unexpected advantage, however, that the formation of perforations using heated needles as described serves to soften the gelatin wall adjacent to the needled aperture as seen in FIG. 3. The needle end 18 (shown in broken outline) when being inserted in this manner causes the gelatin wall to soften and flow slightly in the direction of insertion of the needle so that the wall of the cap 11 at the leading edge becomes rounded and at the trailing edge 11a is displaced into the margin of the wall of the body 12. After the needle is withdrawn, the softened gelatin margins or walls of the perforations become cool and set hard in the displaced configuration. This produces a "rivet" effect whereby the cap and body parts in the double-walled portion 15 (FIG. 1) are locked together so that the two capsule parts will not pull apart. This desirably insures that the contents 17 will be retained inside the capsule and will not be lost or spilled. The use of a heated needle also serves to solidify by thermal action the contacted particles of the fill 17. Powdered coffee particles, for example, when contacted by the needle end 19 tend to soften and fuse together in a crust with the desirable result that the same resists flowing and hence may serve to provide a unitary barrier not only to retain the flavor and aroma of the food content but also to guard against leakage of the fill 17 through the apertures 16. The invention also contemplates forming the perforations prior to joining the cap and body parts. This, however, is less satisfactory because of the need to provide open communication in the double-walled portion 15 (by means of perforations in registry) following the joining of the cap and body parts.

An important advantage of the invention is that the gelatin envelope is edible and has valuable food properties. The invention contemplates the use of not only gelatin but also other materials having the desired properties of gelatin which materials for purposes of the invention can be substituted in whole or in part for gelatin. In general, the invention requires a capsule material of edible or pharmaceutical grade suitable for manufacture by the dip-molding technique described, for example, in U.S. Pat. Nos. 3,258,115 and 3,399,803. The size and type of the capsule can be varied if desired. Although the size is not critical it is preferred to use a size such that the total food requirement for a serving is supplied in a single capsule. For this purpose, depending on the nature of the food, the capsule ordinarily should be size 000 or larger. A No. 000 capsule, for example, holds approximately a half gram of instant coffee powder. Two such filled capsules or a single 0.1-ounce (also known as No. 13) filled capsule added to hot water are the equivalent of a cup of prepared or reconstituted coffee.

Various modifications in the capsules can be made. For example, the capsule can be of the self-locking type, e.g., as shown in U.S. Pat. No. 3,399,803. If desired, the capsule can be transparent so that the contents can be readily viewed or it can be opaque, colored, color coded, printed, etc. Since gelatin contains many valuable nutritional elements but lacks the essential amino acid tryptophan, the latter amino acid or other food elements, if desired, can be incorporated with the contents of the capsule to provide a complete food nutriment.

The contents of the capsule according to the invention can be any desired instant food or food extract. For purposes of definition, the term "instant food" as used herein is intended to include any dry or anhydrous soluble food product which with addition of water provides a suitable reconstituted food. The expression "anhydrous" or "anhydrous food" is to be understood for purposes of the invention to include hands which are completely dry or which have a low percentage of water compatible with good keeping qualities in the gelatin envelope. Foods containing minor amounts of water, e.g., from 1 to 5 percent by weight or higher up to about 15 percent, are satisfactory and are contemplated. The term is meant to include food extracts generally, as well as foam-dried foods, freeze-dried foods and the like. It includes dehydrated coffee, tea, cream, milk, chocolate, cocoa, soup, sweeteners, essences, fillers, flavoring and the like, as well as mixtures of the same where appropriate. The food can be in the form of a powder, crystal, pellet, granule, tablet or other particulate form having a relatively large surface-to-volume ratio. In general, the water solubility of the food contents should be not less than the gelatin envelope used in the particular food product. Since gelatin is slowly soluble in cold water, the invention contemplates the use of hot water for constitution purposes—preferably water heated to about 90° C. or higher and for the best results at 95° C. or higher. At lower temperature, dissolution requires correspondingly longer periods of mixing.

For the purposes of the invention, the capsules can be filled in any suitable manner, preferably using automatic capsule filling machinery. The fill can be increased by use of densified pellets or the like or by compressing or slugging techniques. For rapid dissolving, food contents in loose or compacted freeze-dried form as opposed to foam-dried form, are preferred.

In a typical case illustrating the invention, using 400–490 mg. of powdered coffee (instant Nescafe coffee), No. 000 gelatin capsules were filled. Two such capsules are roughly equivalent in coffee content to a level teaspoonful of Nescafe coffee, i.e. 0.9 to 1 g. A single capsule of this type having 20 body perforations (No. 20 needle) and five perforations in each of both end portions, as illustrated in FIG. 1 and described above, dissolved with agitation in 250 ml. of hot (95° C.) water. The capsule contents were dispersed in 10 seconds and the gelatin capsule dissolved in 30 seconds. For purposes of definition herein, the time required for entry of water into the capsule interior and dissolving or dispersion of the contents from within the capsule to the exterior is known as the "emptying time." Also, the time required for dissolving the capsule itself is known as the "capsule dissolution time." Thus, for the special case just mentioned the emptying time was 10 seconds and the capsule dissolution time was 30 seconds. In a comparable test, conventional No. 000 capsules filled with the same material but lacking perforations required 1¾ to 2 minutes to disperse the contents and dissolve most of the gelatin capsule. However, even after this time dark portions of mixtures of gelatin and coffee remained and failed to dissolve.

Results with a different fill or with a different type of food content in the same kind of perforated capsule specified (30 apertures, No. 20 gauge) are the following:

| Contents | | Food content emptying time | Capsule dissolution time |
| --- | --- | --- | --- |
| 1.2 g. | cane sugar | X 5 sec. | 45 sec. |
| 0.5 g. | instant cream (Borden's Cremora) | 7 sec. | 45 sec. |
| 0.4 g. | Chase & Sanborn Instant Coffee | 20 sec. | 40 sec. |
| 0.4 g. | Instant Nescafe Coffee | 10 sec. | 30 sec. |
| 0.38 g. | Lipton's Iced-Tea Mix | 8 sec. | 60 sec. |
| 0.56 g. | Hershey's Cocoa | 20 sec. | 45–62 sec. |
| 0.55 g. | Nestle's Quik | 18 sec. | 42 sec. |
| 1.57 g. | Steera Chicken Bouillon, granular | 17 sec. | 33 sec. |

Comparable figures for similar capsules filled with 0.38–0.4 grams of Instant Nescafe and perforated in the same pattern but with a different perforation diameter, are the following:

| Needle gage no. | Food content emptying time | Capsule dissolution time |
| --- | --- | --- |
| 19 | 7 sec. | 30–35 sec. |
| 22 | 20 sec. | 150 sec. |

By increasing the number of perforations using a No. 22 needle to provide 30 body perforations and 10 perforations in each of the capsule ends, the emptying time is substantially the same but the capsule dissolution time is shortened to about 1 minute.

It will be understood that wide variations can be made by those skilled in the art of the embodiments described above, without departing from the spirit of the invention as claimed below, and it is intended that the claims should be interpreted as covering the invention as described above and any such variation thereof.

I claim:

1. A packaged food article for constitution with water comprising a cylindrical water-soluble hard shell gelatin capsule cape and matching body telescopically joined to define an envelope characterized by two opposite end portions and cylindrical walls therebetween including a double-walled portion, a fill of anhydrous, particulate instant food in the envelope, a spaced array of perforations in the cap and body serving to provide open communication between the exterior of the capsule and the interior of the envelope, the perforations being adapted for passage of water and being located in the end portions and walls including the double-walled portion, perforations of the cap in the double-walled portion being in registry with corresponding perforations in the body whereby open communication as aforesaid is provided in the double-walled portion, the individual perforations in the cap and body being sufficiently small to retain the fill yet sufficiently large that when the capsule is immersed and agitated in a quantity of hot water the perforations allow immediate entry of water to provide substantially immediate dissolution or dispersion of the food and accompanying residue-free dissolution of the cap and body.

2. An article according to claim 1 wherein the open communication provided is at least equal to that provided by an array of perforations which are circular and at least about 0.7 mm. in diameter and are located at evenly spaced points and consist of 20 perforations through the cylindrical walls and five perforations in each of the two end portions.

3. An article according to claim 2 wherein 10 of the perforations are located in the double-walled portion of the envelope.

4. An article according to claim 1 wherein the cap and body are fused together at margins of the perforations in the double-walled portion.

5. An article according to claim 1 wherein the capsule size is at least equivalent to capsule-size 000.

6. An article according to claim 1 wherein the fill of instant food includes a coffee extract.

7. An article according to claim 6 wherein the coffee is freeze-dried coffee.

8. An article according to claim 1 having an emptying time of less than about 30 seconds and a capsule dissolution time of not more than about 60 seconds.

9. An article according to claim 1 having a heat-fusible fill and having portions of the fill adjacent the perforations fused to provide a barrier against leakage of the fill from the perforations.

* * * * *

PO-1050
(5/69)

UNITED STATES PATENT OFFICE
CERTIFICATE OF CORRECTION

Patent No. 3,620,759      Dated November 16, 1971

Inventor(s)    V Harold Maddox

It is certified that error appears in the above-identified patent and that said Letters Patent are hereby corrected as shown below:

Column 2, line 8, correct "indicted" to read --indicated--;

Column 3, line 53, correct "hands" to read --foods--;

Column 4, line 38, delete "X" from the table;

Claim 1, line 3, correct "cape" to read --cap--.

Signed and sealed this 23rd day of May 1972.

(SEAL)
Attest:

EDWARD M.FLETCHER,JR.            ROBERT GOTTSCHALK
Attesting Officer                 Commissioner of Patents